United States Patent
Lucea et al.

(10) Patent No.: US 10,008,861 B2
(45) Date of Patent: Jun. 26, 2018

(54) CHARGE BALANCING IN A BATTERY

(71) Applicants: RENAULT S.A.S., Boulogne Billancourt (FR); COMMISSARIAT A L'ENERGIE ATOMIQUE ET AUX ENERGIES ALTERNATIVES, Paris (FR)

(72) Inventors: Marc Lucea, Boulogne Billancourt (FR); Laurent Garnier, Marennes (FR)

(73) Assignees: RENAULT S.A.S. (FR); COMMISSARIAT A L'ENERGIE ATOMIQUE ET AUX ENERGIES ALTERNATIVES (FR)

( * ) Notice: Subject to any disclaimer, the term of this patent is extended or adjusted under 35 U.S.C. 154(b) by 0 days. days.

(21) Appl. No.: 14/401,444

(22) PCT Filed: May 13, 2013

(86) PCT No.: PCT/FR2013/051042
§ 371 (c)(1),
(2) Date: Nov. 14, 2014

(87) PCT Pub. No.: WO2013/171416
PCT Pub. Date: Nov. 21, 2013

(65) Prior Publication Data
US 2015/0137736 A1  May 21, 2015

(30) Foreign Application Priority Data
May 15, 2012 (FR) .................................. 12 54446

(51) Int. Cl.
*H02J 7/00* (2006.01)
*B60L 11/18* (2006.01)
(Continued)

(52) U.S. Cl.
CPC ......... *H02J 7/0014* (2013.01); *B60L 11/1809* (2013.01); *B60L 11/1866* (2013.01);
(Continued)

(58) Field of Classification Search
CPC ...................................................... H02J 7/0014
See application file for complete search history.

(56) References Cited

U.S. PATENT DOCUMENTS

| 5,666,041 A | 9/1997 | Stuart et al. ..................... 320/15 |
| 5,726,551 A * | 3/1998 | Miyazaki ............ B60L 11/1803 320/104 |

(Continued)

FOREIGN PATENT DOCUMENTS

| CN | 101145625 A | 3/2008 |
| EP | 2 276 140 | 1/2011 |

(Continued)

OTHER PUBLICATIONS

International Search Report dated Aug. 5, 2013 issued in corresponding International patent application No. PCT/FR2013/051042.
(Continued)

*Primary Examiner* — Robert Grant
*Assistant Examiner* — Tynese McDaniel
(74) *Attorney, Agent, or Firm* — Ostrolenk Faber LLP

(57) ABSTRACT

A device for balancing charge in a battery (2) having a set of electrochemical storage cells ($C_1$, $C_2$, ..., $C_R$), and a charging means ($R_1$, ..., $R_s$) able to recharge a plurality of combinations of at least one cell, in which for each combination of the plurality of combinations, the charging means are arranged in order to simultaneously recharge all the cells of said combination, the plurality of combinations defining a number N strictly higher than one of combination types, each combination type corresponding to a number m of cells in this combination, and the charging means are permitted to (Continued)

function at a number P of power levels, this number P being strictly lower than the number N of combination types.

6 Claims, 2 Drawing Sheets

(51) Int. Cl.
*H01M 10/44* (2006.01)
*H01M 10/42* (2006.01)

(52) U.S. Cl.
CPC ......... *H01M 10/441* (2013.01); *H02J 7/0016* (2013.01); *H02J 7/0018* (2013.01); *H02J 7/0027* (2013.01); *H02J 7/0054* (2013.01); *B60L 2210/10* (2013.01); *B60L 2240/545* (2013.01); *B60L 2240/547* (2013.01); *B60L 2240/549* (2013.01); *H01M 2010/4271* (2013.01); *Y02T 10/7011* (2013.01); *Y02T 10/7055* (2013.01); *Y02T 10/7061* (2013.01); *Y02T 10/7216* (2013.01)

(56) References Cited

U.S. PATENT DOCUMENTS

| | | | |
|---|---|---|---|
| 6,072,300 A | 6/2000 | Tsuji | |
| 6,373,223 B1* | 4/2002 | Anzawa | H02J 7/0018 320/116 |
| 9,130,391 B2 | 9/2015 | Garnier et al. | |
| 2005/0077879 A1* | 4/2005 | Near | H02J 7/0018 320/166 |
| 2008/0116850 A1 | 5/2008 | Konishi et al. | |
| 2009/0237030 A1* | 9/2009 | Oh | H02J 7/0016 320/108 |
| 2010/0148726 A1* | 6/2010 | Lee | H02J 7/0016 320/118 |
| 2011/0121645 A1 | 5/2011 | Zhang et al. | |
| 2011/0140663 A1* | 6/2011 | Tofigh | H02J 7/0018 320/116 |
| 2011/0234164 A1* | 9/2011 | Furukawa | H02J 7/0018 320/118 |
| 2012/0049801 A1 | 3/2012 | Chang | |
| 2012/0109442 A1* | 5/2012 | Kato | B60W 10/26 701/22 |
| 2013/0002201 A1* | 1/2013 | Bodkin | H02J 7/0016 320/118 |
| 2013/0076310 A1* | 3/2013 | Garnier | H02J 7/0016 320/118 |
| 2013/0285602 A1* | 10/2013 | Nergaard | B60L 11/1816 320/108 |
| 2014/0076875 A1* | 3/2014 | Gale | B60W 10/30 219/202 |

FOREIGN PATENT DOCUMENTS

| | | |
|---|---|---|
| EP | 2 320 537 A2 | 5/2011 |
| FR | 2 956 260 A1 | 8/2011 |
| JP | 2007-012407 A | 1/2007 |
| JP | 2009-44802 | 2/2009 |
| JP | 2009-044802 | 2/2009 |
| JP | 2014-512788 | 5/2014 |
| KR | 10-2007-0111587 | 11/2007 |
| WO | WO 97/16879 A1 | 5/1997 |
| WO | WO 2011/095610 A2 | 8/2011 |
| WO | WO 2012/120030 | 9/2012 |

OTHER PUBLICATIONS

Chinese Notification of the First Office Action dated May 13, 2016 in corresponding Chinese Patent Application No. 201380025504.2 with Search Report (English language translation)(10 total pages).
Japanese Office Action dated May 9, 2017 issued in Japanese Patent Application No. 2015-512104 with an English language translation.

* cited by examiner

CHARGE BALANCING IN A BATTERY

CROSS REFERENCE TO RELATED APPLICATIONS

The present application is a 35 U.S.C. § 371 National Phase conversion of PCT/FR2013/051042, filed May 13, 2013, which claims benefit of French Application No. 1254446, filed May 15, 2012, the disclosure of which is incorporated herein by reference. The PCT International Application was published in the French language.

TECHNICAL FIELD OF THE INVENTION

The invention relates to the balancing of charge in a battery, specifically a lithium-ion battery.

BACKGROUND OF THE INVENTION

Although applications for the invention may be found in the automobile industry, specifically for electric and/or hybrid vehicles, the invention is by no means limited to these applications. The invention might be deployed, for example, in embedded systems or other systems.

A battery comprises a set of electrochemical storage cells, or electrochemical accumulators, such as lithium-ion cells, arranged in series and/or in parallel.

It is endeavored to maintain each cell within a restricted voltage range, in order to prevent irreversible deterioration. For example, in the case of a lithium-ion battery, there is a risk of fire where the cell voltage exceeds a maximum threshold, and a risk of irreversible deterioration in the cell where the voltage falls below a minimum threshold.

In practice, where a large number of cells are assembled in a pack, for example 96 cell pairs in battery packs for an electric vehicle, the cells are likely to show slightly different characteristics, some of which, such as the auto-discharge current, the Faradaic yield when charged, the maximum charge, etc. may have a direct influence upon the charging state of cells. Accordingly, where a battery pack is charged, variations in the level of charge may be observed from one cell to another.

An arrangement is known whereby each cell or tier of cells respectively is connected in parallel to a resistance via a switch, in order to permit discharging in case of the excessive charging of a cell. Dissipative balancing describes the dissipation of surplus energy as heat.

The management of energy transfers from the most highly-charged cells to other cells is also known. Non-dissipative balancing systems of this type may be advantageous, in that thermal radiation is lower, thereby preventing any potential damage to adjoining cells and electronic circuits. Moreover, these non-dissipative balancing operations, if executed during the discharging of the battery, may permit the optimum distribution of individual cell charges, such that the minimum charging state of each cell is achieved on a substantially simultaneous basis. This may extend the battery service life.

Battery charge balancing devices are known comprising converters, whereby each converter permits the recharging of one cell at a time. So as not to increase the number of converters, systems may be arranged for the selection of the cell to be charged or discharged, specifically based upon transistors, whereby the secondary side of the converter is connected to the selected cell. However, these selection systems may generate additional losses.

The simultaneous charging of multiple cells is also known. A battery charge balancing system is known, comprising a converter for the simultaneous recharging of multiple cells in a battery. For example, document FR2956260 describes a system of this type. In this document, the converter functions as a voltage generator, the level of which is regular, thereby delivering a predetermined balancing current to each cell. The main drawback of this system is the fact that the converter recharges the cells at a constant charging current, regardless of the number of cells to be recharged, thereby resulting in an equal number of converter service capacity levels to the number of cells which may be recharged simultaneously: a first level, corresponding to the recharging of 1 cell only, a second level corresponding to the recharging of 2 cells at a time, a third level corresponding to the recharging of 3 cells at a time, etc. This means that, in the majority of cases, the converter is operating far from its optimum service capacity, thereby resulting in substantial energy losses. A further drawback is the fact that operation at a constant current does not permit the more rapid recharging of a small number of cells which have been discharged to a particularly low level, with a potential restriction on the performance of the balancing system.

Accordingly, there is a need for a more efficient balancing system.

SUMMARY OF THE INVENTION

A charge balancing device in a battery is proposed, comprising a set of electrochemical storage cells, the device comprising charging means which are capable of recharging a plurality of combinations of at least one cell. For at least one (and advantageously each) combination, the charging means are arranged in order to simultaneously recharge all the cells in said combination. The plurality of combinations defines a number N of combination types, whereby each combination type corresponds to a number m of cells in said combination, wherein N is strictly higher than 1. The charging means are permitted to function at a number P of power levels, whereby the number P is strictly lower than the number N of combination types.

Accordingly, there are fewer power levels than types of combinations (or sets) of cells, which may permit the charging means to function closer to their optimum working point than in the prior art, wherein a predetermined current was delivered to each cell.

Indeed, in the prior art, the power delivered by the charging means is specifically associated with the number of cells to be supplied simultaneously, as each cell receives a predetermined current. By restricting the number of available power levels, it is possible to operate the charging means, for example a converter, closer to its optimum service capacity, which may make it possible to limit energy losses and enhance the performance of the balancing device.

Advantageously, and not by way of limitation, the charging means comprise a plurality of charging modules, at least one (and advantageously each) charging module corresponding to a group of M cells selected from all the constituent cells of the battery. Accordingly, each charging module, for example a converter, may permit the recharging of combinations of m cells from the M cells of the corresponding group.

Advantageously, the number P is equal to or lower than the integer part of M/2, advantageously M/3.

The number of simultaneously-rechargeable cells may or may not be restricted. For example, the number of simultaneously-rechargeable cells may be restricted by the use of a 3-cell charging module. In this case, N is equal to 3, as there will be three combination types available: combinations of a single cell of the M cells in the group, combinations of two cells of the M cells in the group, and combinations of three cells of the M cells in the group.

Alternatively, the charging module may be configured for the simultaneous recharging of 1 to M cells. In this case N is equal to M, as M combination types will be available. The first combination type corresponds to the selection of a single cell of the M cells in the group, the second set type corresponds to the selection of two cells from the M cells, etc. The $M^{th}$ set type corresponds to all the M cells in the group.

Advantageously, and not by way of limitation, the charging means may be arranged such that each cell in the group of cells corresponding to said charging means may be charged independently of the other cells in said group. In other words, cells may be selected individually.

In one form of embodiment, the number P of power levels is equal to 1. Accordingly, the charging means operate at a single power level, regardless of the number of cells to be recharged simultaneously. This form of embodiment may also be advantageous in that, where one cell in the group of cells shows a lower charge, this cell is recharged relatively rapidly, as the converter will effect recharging at a relatively high recharging current, such that the cell concerned will be restrictive for a relatively short time period.

In another form of embodiment, a plurality of power levels is provided, for example two, three or four power levels. This may permit the restriction of charging currents, specifically where the number of cells selected for charging is relatively low. Accordingly, in this form of embodiment, cabling and circuitry may be relatively simple, in that the charging currents will be restricted.

For example, three power levels may be provided:
- a 16-watt power level, corresponding to the charging of a single cell. Where the cell voltage is close to 4 V, a power level of 16 watts corresponds to a charging current close to 4 A.
- a 32-watt power level, corresponding to the simultaneous charging of two cells, here again with charging currents of the order of 4 A.
- a 48-watt power level, corresponding to the simultaneous charging of three or more cells.

Where the converter is responsible for the charging of exactly three cells, each cell will substantially receive a current of 4 A. If the converter is responsible for the charging of four cells, the current assigned to each cell will be close to 3 A. For the simultaneous charging of six cells, the current corresponding to one cell will be close to 2 A. Accordingly, the current corresponding to one cell reduces as the number of cells increases. However, this reduction remains relative.

The invention is not limited by the form of the charging means, although, advantageously, the charging means may comprise a converter which is capable of converting energy received. For example, charging means may be provided which incorporate an additional battery, which is dedicated to the balancing function, together with means for the connection of the additional battery to the cells of the battery to be balanced.

Likewise, the invention is not limited by the source of energy received by the converter.

Advantageously, and not by way of limitation, the charging means, for example a converter, may be connected to a network of lower voltage rating than that delivered by the battery to be balanced.

Advantageously, and not by way of limitation, this network of lower voltage rating may be supplied by the battery to be balanced.

In the case of a motor vehicle, the 14 V network is itself supplied by a high-voltage network, which is supplied by the battery to be balanced. Accordingly, and indirectly, energy is tapped from all the cells of the battery. The selection of a 14 V network is also advantageous, in that energy is received by the converter at a relatively low voltage, which may limit design constraints on the converter and circuitry.

In a further form of embodiment, a connection may be arranged between the converter input and at least some of the cells in the battery to be balanced, in order to allow the direct take-up of energy generated in these cells, either the group of cells or all the cells in the battery. In the first case, excessively high currents and voltages at the converter input may be avoided. In the second case, the discharge associated with balancing is of limited significance, as it is distributed over all the cells.

The totality of cells may comprise a number of cells, for example of the order of one hundred. The group of cells may comprise a number of cells which is lower than the total number of cells, for example, a number of cells of the order of ten.

Advantageously, and not by way of limitation, the charging means may comprise a plurality of switches for the reversible connection of the converter to the cells in the group of cells.

Advantageously, and not by way of limitation, the charging means may comprise processing means which are capable of generating signals for the control of the switches. Such processing means may be configured for the detection of the cells to be recharged, as a function of their current charge level, and for the control of charging means in order to select those cells which are to be recharged.

Advantageously, and not by way of limitation, said processing means may be configured for the determination of the service capacity level of the converter, as a function of the number of cells to be supplied.

In one form of embodiment, the charging means may comprise a primary winding connected to an inverter and, for each cell in the group of cells corresponding to said charging means, a secondary winding, together with a rectifier.

Advantageously, and not by way of limitation, the processing means may control the inverter and/or the rectifiers, by controlling the charging currents such that the converter is set to a receiving power level selected from a number P of power levels, which is strictly lower than the number N of combination types.

The invention is not limited by the form of the converter. This may be provided, for example, in the form of a chopper, a charge pump converter, or another type of converter.

An electricity supply system is also proposed, specifically for a motor vehicle, comprising a battery and a balancing device as described above.

For the purposes of application in electric and/or hybrid vehicles, the battery to be balanced may be capable of supplying a vehicle traction system.

A motor vehicle is also proposed, for example an electric or hybrid vehicle, comprising an electricity supply system as described above.

A control method is also proposed for a charge balancing device for a battery comprising a set of electrochemical storage cells, the balancing device comprising charging means which are capable of the simultaneous recharging of multiple cells, whereby said method comprises:

the selection of a combination of at least one cell to be simultaneously recharged from a plurality of combinations, said plurality of combinations defining a number N which is strictly higher than one combination type, whereby each combination type corresponds to a number m of cells in said combination, and the imposition upon the converter of a power level selected from a number P of power levels, whereby said number P is strictly lower than the number N of combination types.

The method may, for example, be deployed in the balancing device described above, or in a control device which is either separate from, or integrated in the balancing device.

The control device may comprise, or be integrated in a digital or analog signal processing device, for example a processor.

Specifically, the control device may control:

a receiving element for the charge delivered by the charging means, for example a primary winding, and/or a transmitting element for the charge delivered by the charging means, for example a rectifier and/or a secondary winding.

This control may be executed as a means of increasing the charging currents in each cell selected for charging, where the number of cells selected is reduced. Accordingly, the method may comprise a stage which consists in determining at least one cell charging current, as a function of the number of cells in the combination of cells to be recharged, such that the power level of the charging means corresponds to a level selected from a number P of levels, whereby P is strictly lower than the number N of combination types.

Where the number of power levels is greater than one, the method may comprise a stage which consists in determining a power level as a function of the number of cells to be recharged.

A control device is also proposed for a charge balancing device for a battery comprising a set of electrochemical storage cells. The balancing device comprises charging means which are capable of recharging a plurality of combinations of at least one cell, wherein, for each combination in the plurality of combinations, the charging means are configured for the simultaneous recharging of all the cells in said combination, and wherein the plurality of combinations defines a number N which is strictly higher than one combination type, whereby each combination type corresponds to a number m of cells in said combination. The control device is configured for the imposition upon the charging means of a power level selected from a number P of power levels, whereby said number P is strictly lower than the number N of combination types.

Advantageously, the control device may also be configured for the selection of the combinations of cell(s) to be recharged, as a function of values for the charging level of battery cells.

BRIEF DESCRIPTION OF THE DRAWINGS

The invention will be clarified by reference to the figures, which illustrate forms of embodiment which are not provided by way of limitation.

Identical references may be transposed from one figure to the other, for the designation of identical or similar elements.

DESCRIPTION OF EMBODIMENTS

Figure 1:
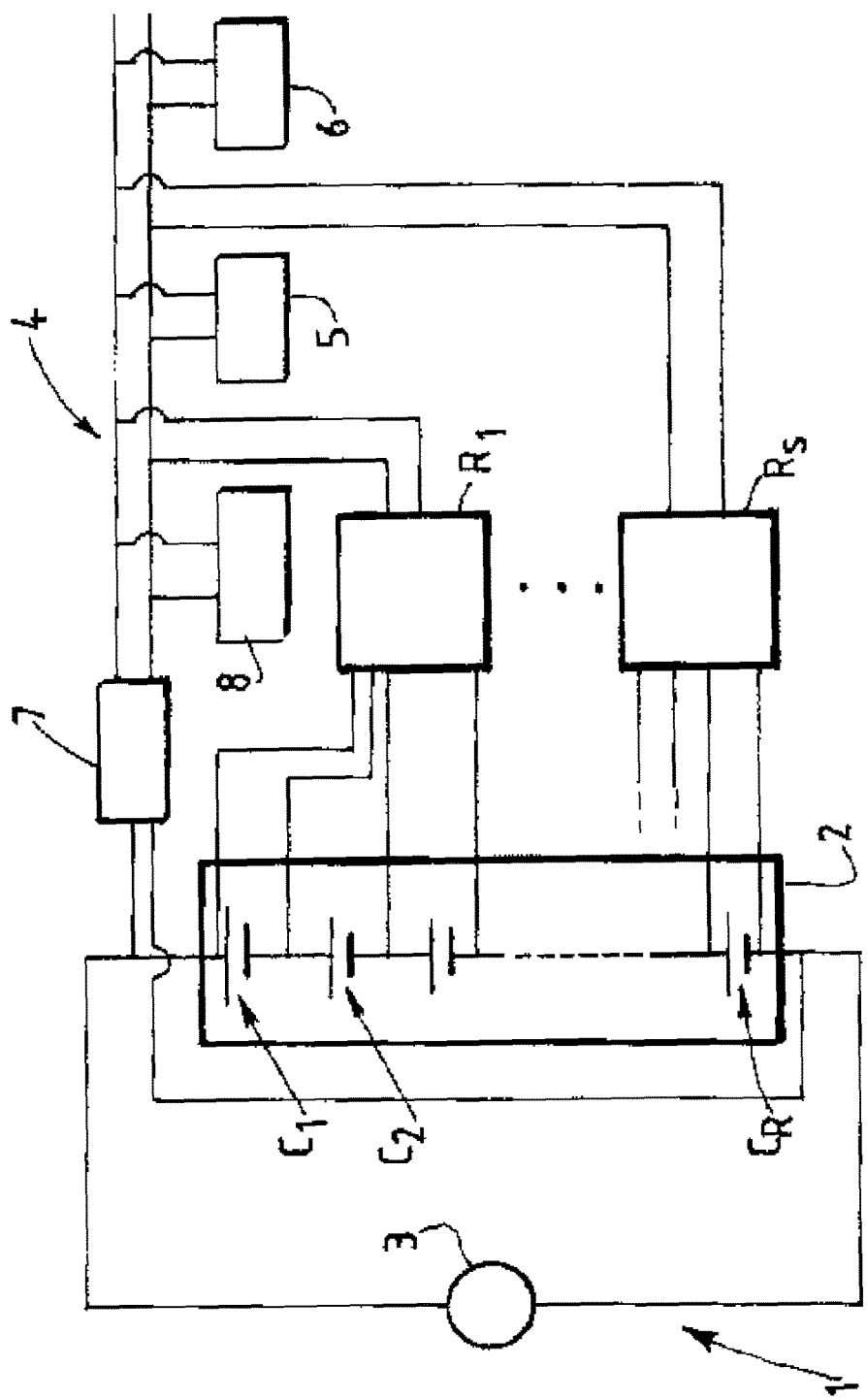
FIG. 1 shows a schematic representation of an electricity supply system for a motor vehicle, according to one form of embodiment of the invention.

With reference to FIG. 1, a high-voltage network 1 is supplied by a high-voltage battery 2 comprising a set of R electrical cells $C_1, C_2, \ldots, C_R$. This lithium-ion battery 2 specifically supplies an electric motor 3, thereby ensuring the propulsion of a motor vehicle. The battery 2 may supply a voltage ranging, for example, from 70 volts to 400 volts.

The vehicle also comprises a low-voltage network 4 for the supply to auxiliaries 5, 6 of a voltage ranging from 10 volts to 16 volts, for example a voltage of 14 volts. These auxiliaries 5, 6 may comprise, for example, the power-assisted steering actuator of the vehicle, or another auxiliary.

The low-voltage network 4 is connected to the high-voltage network 1 via a d.c./d.c. converter 7. For the charging of a low-voltage battery 8 on the low-voltage network 4, for example a lead-acid battery, energy is tapped from the high-voltage battery 2 by means of the converter 7.

All the cells $C_1, C_2, \ldots, C_R$ arranged in series in the high-voltage battery 2 undergo the same variation in charge during the recharging of the low-voltage battery 8.

The system also comprises a number S of converters $R_1 \ldots R_S$. Each converter $R_1, \ldots, R_S$ permits the recharging of cells from a group of M cells associated with the converter concerned. The group of M cells, for example 12 cells, is selected from the R cells of the battery 2.

For example, the battery 2 comprises 96 cells $C_1, C_2 \ldots C_R$. These 96 cells are divided into 8 groups of 12 cells respectively. In this example, the number S of converters is therefore equal to 8, and the number R of cells is equal to 96. The number M of cells per group is 12.

In this form of embodiment, the S converters $R_1, \ldots, R_S$ are connected to the 14 V network 4 via their respective primary windings, and permit the transfer of energy to one or more cells among the M respective cells to which they are connected via their secondary windings.

Accordingly, said S converters tap energy from the low-voltage network 4, said low-voltage network itself being supplied by the high-voltage battery 2. In other words, said converters $R_1, \ldots, R_S$ indirectly use energy tapped from the combination of R cells $C_1, C_2 \ldots C_R$ in the high-voltage battery 2.

The energy tapped is therefore distributed between all said R cells, which may make it possible to prevent any charge imbalances between one group and another.

Moreover, as the voltage on the primary side of the converters $R_1, \ldots, R_S$ is only 14 volts, said converters $R_1, \ldots, R_S$ may be of relatively simple design, and appropriate for low-voltage ratings.

Figure 2:
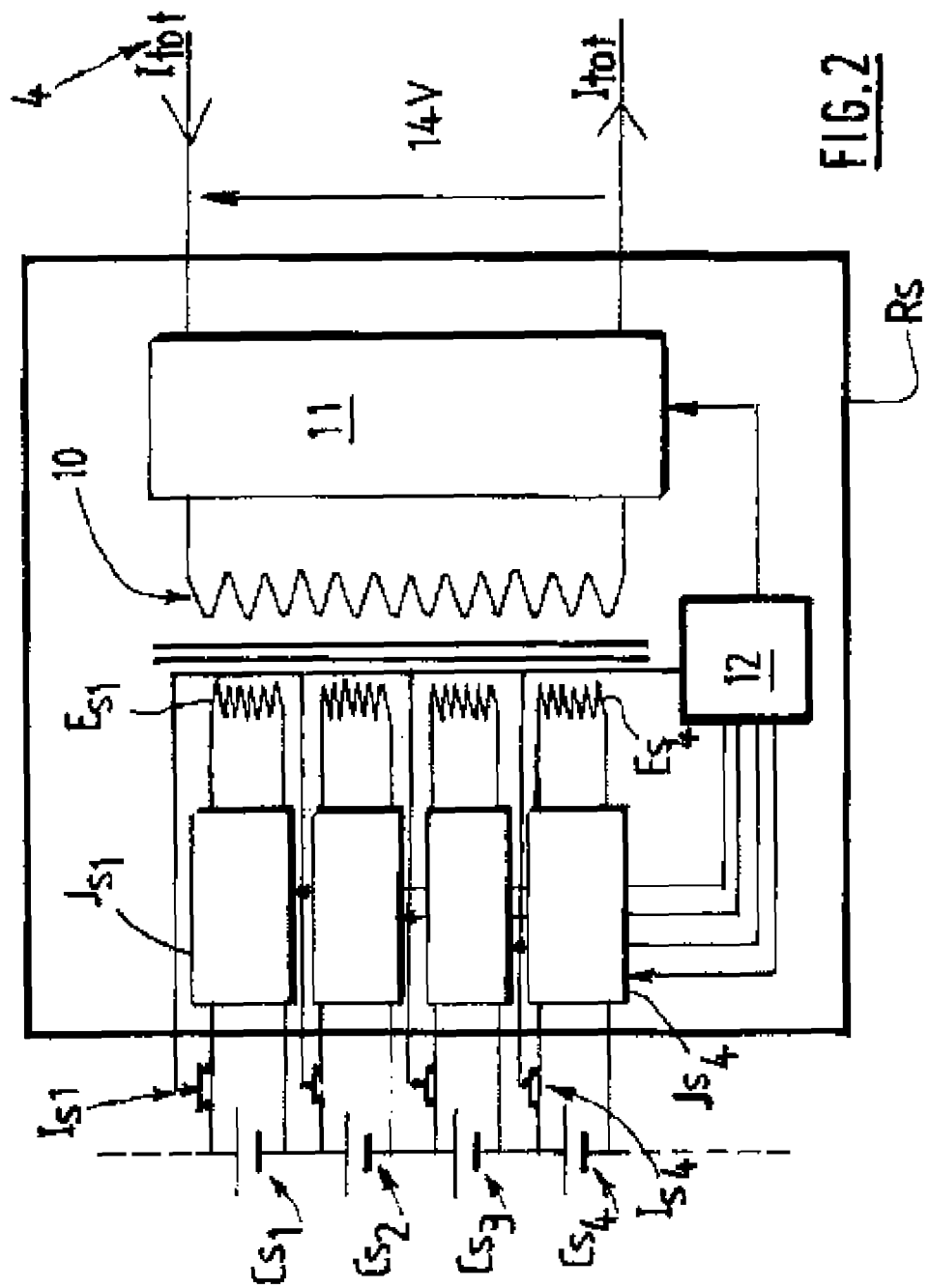
FIG. 2 shows a schematic representation of an example of a charge balancing device for a battery, according to one form of embodiment of the invention.

FIG. 2 shows a more detailed representation of an example of a converter $R_s$. In this example, the converter $R_s$ is connected to only four cells $C_{s1}, C_{s2}, C_{s3}, C_{s4}$, for reasons of clarity, but it will be understood that the number of cells may differ from 4, and specifically may be equal to 12.

The converter $R_s$ comprises a primary winding 10, connected via an inverter 11 to the 14 V network 4.

The converter $R_s$ is also provided with as many secondary windings $E_{s1}, \ldots, E_{s4}$ as the number of cells $C_{s1}, C_{s2}, C_{s3}, C_{s4}$ to which the converter $R_s$ may be connected. Accordingly, a converter $R_s$ corresponding to a group of M cells will comprise M secondary windings.

In addition to a secondary winding corresponding to the cell concerned, the converter $R_s$ comprises, for each of the M cells to which it is connected, a switch $I_{s1}, \ldots, I_{s4}$.

In FIG. 2, the switches $I_{s1}, \ldots, I_{s4}$ have been represented on the exterior of the housing corresponding to the converter $R_s$, but it will be understood that, advantageously, these switches may be arranged on the interior of said housing.

Each switch $I_{s1}, \ldots, I_{s4}$ is arranged for the potential formation of a connection between the corresponding cell and the corresponding secondary winding. Each switch $I_{s1} \ldots I_{s4}$ is controlled electrically by processing means 12, for example an electronic control unit or ECU.

The processing means 12 may comprise or be integrated in a processor, for example a microcontroller, microprocessor or other processor.

The converter $R_s$ also comprises, for each cell in the group of M cells to which it is connected, a rectifier $J_{s1}, \ldots, J_{s4}$.

The inverter 10 and the rectifiers $J_{s1}, \ldots J_{s4}$ are controlled by the processing means 12, such that the processing means 12 control the current $I_{tot}$ received by the converter, and the charging currents for the cells $C_{s1}, C_{s2}, C_{s3}, C_{s4}$.

In one form of embodiment, each of the balancing converters $R_1, \ldots, R_S$ is unidirectional. In other words, each of said converters $R_1, \ldots, R_S$ permits the transfer of energy from the low-voltage network to the cell(s) to which it is connected, but prevents any transfer of energy in the reverse direction.

In this form of embodiment, each converter $R_1, \ldots, R_S$ functions at a constant capacity—this means that, where at least one cell is selected for recharging, thereby entailing the closure of the control switch associated with this cell, the power tapped on the primary side is set at a predetermined value $P_0$. Accordingly, the current flowing in each cell connected to the secondary winding of the converter will be a function of the number of cells to be recharged.

More specifically, where η is the overall efficiency of the energy transfer system, including losses associated with the converter, command functions and cables, this gives the following:

$$\eta = \frac{P_{out}}{P_{in}} = \frac{\sum_{i=1}^{M} V_i \cdot I_i \cdot \delta_i}{V_{14V} \cdot I_{tot}} = \frac{\sum_{i=1}^{M} V_i \cdot I_i \cdot \delta_i}{P_0} \Leftrightarrow \sum_{i=1}^{M} V_i \cdot I_i \cdot \delta_i = P_0 \cdot \eta$$

where:

$V_{14v}$ is the voltage on the low-voltage network, typically 14 volts, $I_{tot}$ is the total current tapped from the low-voltage network on the primary side of the converter, $V_i$ is the cell voltage, represented by i, where i ranges from 1 to M, $I_i$ is the balancing current flowing in the cell i during the recharging of that cell, $\delta_i$ is a Boolean signal, with a value of 1 where the cell i is being recharged, i.e. if the switch associated with that cell is closed, and 0 in the converse case.

Accordingly, where a single cell of the M cells associated with the converter concerned is being recharged, the current flowing in this cell will be approximately M times greater than in a case where all M cells are being recharged, whereby the approximation specifically stems from the fact that all the cells in the group of M cells are not necessary at exactly the same voltage.

Accordingly, the rate of recharging of cells will be higher, the lower the number of cells to be recharged.

Non-dissipative balancing systems are even more beneficial in that, during the discharging of all the cells in the battery 4, they ensure that a maximum number (and advantageously all) of the cells achieve their minimum charge level simultaneously, thereby permitting the optimum exploitation of the energy stored in the battery 4.

In the event of the dispersion of capacity between the cells, the cell with the lowest capacity of the totality of cells in the battery 4 will be the cell which has achieved its lower threshold at the earliest point, thereby preventing any further utilization of the battery 4. The converters $R_1, \ldots, R_S$ permit the initial and rapid recharging of said cell at minimum charge. These converters therefore permit a more effective utilization of the battery, in that this limiting cell will achieve its lower threshold at a later point.

Where provision is made for a single power level $P_0$, in the case of a single cell at minimum charge, the balancing current flowing in said cell at minimum charge is relatively high, which makes it possible to rapidly restore this limiting cell to the same charge level as the second least-charged cell, whereafter the simultaneous recharging of these two cells will be instructed, and so forth, until the totality of the group of M cells has been balanced.

In other words, where provision is made for a single power level, convergence towards a state of equilibrium may be achieved more rapidly than in the prior art, wherein the balancing converter functions as a voltage generator, the level of which is regulated to deliver a predetermined balancing current. The device described, wherein the converter functions as a current generator, delivers a balancing current to each cell which will be higher, the lower the number of cells in the course of balancing.

A further advantage, associated with this operation at constant power, is that the design of each converter may be optimized for a single working point, thereby permitting the achievement of improved efficiency for the transfer of energy. It is therefore possible to reconcile the simultaneous recharging of multiple cells with operation close to a given working point.

The converters used for the recharging of one or more cells of the respective corresponding groups of cells are supplied by the auxiliaries network of the electric vehicle. Accordingly, the recharging of one or more cells will be accompanied by the slight discharging of the totality of cells, as the supply to the low-voltage network 4 is delivered by the converter 7 in FIG. 1, which taps its power from the totality of cells $C_1, C_2, \ldots C_R$ in the high-voltage battery 2. This permits a further increase in the rate of balancing of the pack of cells 2, in that cells which are not being recharged, and which therefore have a higher charging state than the other cells, will discharge slightly as the cells with the lowest charge are recharged. In this way, it is possible to balance a set of cells without recourse to a second-stage converter, which effects transfers from one group of cells to another.

In another form of embodiment, the proposed system may function at a pseudo-constant power. In other words, each converter may be capable of functioning at multiple power levels, for example three power levels.

For example, where a single cell in the group of M cells is being charged, the power tapped on the primary side of the converter $R_s$ is fixed at a value $P_1$. This value $P_1$ is lower than the value $P_0$ corresponding to a single power level in the preceding form of embodiment.

Where two cells are being charged, the power tapped on the primary side of the converter unit will be fixed at a value $P_2$ which lies between $P_1$ and $P_0$, and is strictly different from these other two power values. Where at least three cells are being charged, the power tapped on the primary side of the converter may be fixed at a value $P_3$ which is equal to the value $P_0$.

The provision of three power levels may permit the selection of standard components for the balancing device, specifically the components on the secondary side of the converter, particularly the transistors and/or diodes for rectification, the cables and various components on the power circuit, the converter windings, etc.

For example, for a group of M=12 cells, the power $P_3$ equal to $P_0$ may be selected at 36 watts, the power $P_1$ may be selected at 12 watts, and the power $P_2$ may be selected at 24 watts. For a cell voltage of approximately 4 volts, the balancing current will therefore be close to 3 amps where one, two or three cells are being charged, and will fall thereafter for a number of cells greater than 3, down to approximately 0.75 amps where all 12 cells are being charged. Naturally, these orders of magnitude are provided by way of indication only.

In another form of embodiment, provision may be made for the supply of converters on the primary side, not by the low-voltage network of a motor vehicle, but directly to all cells from the high-voltage battery. Accordingly, the converter is connected to this battery on both the primary side and the secondary side. This variant will permit the execution of balancing, even in applications where no low-voltage network is available, specifically applications in industry or in embedded systems, for example, for portable computer batteries, solar panels, etc. This variant may therefore permit the independent operation of the system concerned.

The converters may, for example, be connected on the primary side to the terminals of a group of M cells, or the terminals of the battery 2, and on the secondary side to the terminals of each of the M cells to be balanced.

Where the converter is connected to the terminals of the group of M cells on the primary side and individually to the M cells on the secondary side, balancing is completed within said group of M cells. Voltages to be managed by the converter will remain within the same orders of magnitude.

Where the converter is connected on the primary side to the terminals of the battery 2, and on the secondary side to a group of 12 cells only, voltages on the primary side may be higher but, however, this architecture will permit the mutual balancing of average charges in groups of M cells.

What is claimed is:

1. A charge balancing device in a battery comprising a set of electrochemical storage cells, the charge balancing device comprising:
a charger comprising at least two converters;
each converter being associated with a group of M cells chosen among the set of electrochemical storage cells and configured to recharge a plurality of combinations of cells among the M cells of the associated group, said plurality of combinations comprises at least a first combination of cells comprising a first number of cells, a second combination of cells comprising a second number of cells, said second number being higher than the first number, and a third combination of cells comprising a third number of cells, the third number being different from the first number and from the second number, such that the plurality of combinations defines a number N of combination types,
wherein N is higher or equal to 3, each combination type corresponding to a number of cells in said combination, wherein for each combination of cells within the group, the converter associated with the group is arranged to simultaneously recharge all the cells of said combination,
each converter is configured to function at P output power levels,
wherein the number P is at least two and is lower than the number N of combination types, the power levels at which each converter functions comprising at least a first power level and a second power level higher than the first output power level, each converter being configured to function at the first power level at least when the number of cells to be charged equals the first number, to function at the second output power level at least when the number of cells to be charged equals the second number, and to function at the second output power level when the number of cells to be charged equals the third number,
wherein each converter comprises:
a single primary winding connected to an inverter, and
for each cell of the M cells of the associated group a secondary winding connected to a respective cell through a respective switch an a respective rectifier, the M secondary windings being coupled to the single primary winding; and
an automated processor configured to control the inverter and the switch for each of the M cells to select a number of cells to be recharged less than the number M of cells associated with the converter in order to increase the charge currents of each selected cell to be recharged when the number of selected cells decreases.

2. The balancing device as claimed in claim 1, wherein each converter is arranged to receive energy from a network of lower voltage rating than the voltage delivered by the battery, the network being supplied by said battery.

3. The balancing device as claimed in claim 1, wherein each converter is connected to at least some of the cells in the battery, and configured to receive directly energy generated in these cells.

4. An electricity supply system for a motor vehicle, comprising a battery configured to supply a motor vehicle propulsion system, and the charge balancing device as claimed in claim 1.

5. A motor vehicle comprising an electricity supply system as claimed in claim 4.

6. The balancing device as claimed in claim 1, wherein the inverter is positioned between the primary winding and a DC power source, and the inverter is configured to regulate power to the primary winding.

* * * * *